(12) United States Patent
Verghese et al.

(10) Patent No.: US 11,131,781 B2
(45) Date of Patent: Sep. 28, 2021

(54) PROGRAMMABLE SIPM ARRAYS

(71) Applicant: Waymo LLC, Mountain View, CA (US)

(72) Inventors: Simon Verghese, Mountain View, CA (US); Caner Onal, Mountain View, CA (US); Pierre-Yves Droz, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 16/577,021

(22) Filed: Sep. 20, 2019

(65) Prior Publication Data

US 2021/0088681 A1 Mar. 25, 2021

(51) Int. Cl.
*G01S 17/89* (2020.01)
*G01T 1/24* (2006.01)
*G01T 1/29* (2006.01)
*G01T 1/208* (2006.01)
*G01T 1/20* (2006.01)
*G01S 17/90* (2020.01)

(52) U.S. Cl.
CPC ............. *G01T 1/248* (2013.01); *G01S 17/90* (2020.01); *G01T 1/208* (2013.01); *G01T 1/2018* (2013.01); *G01T 1/2985* (2013.01)

(58) Field of Classification Search
CPC ....... G01T 1/248; G01T 1/2985; G01T 1/208; G01T 1/2018; G01S 17/90
See application file for complete search history.

(56) References Cited

U.S. PATENT DOCUMENTS

| | | | |
|---|---|---|---|
| 8,395,127 B1 | 3/2013 | Frach et al. | |
| 9,466,631 B2 | 10/2016 | Fallica et al. | |
| 2013/0015331 A1 | 1/2013 | Birk et al. | |
| 2016/0218236 A1 | 7/2016 | Dhulla et al. | |
| 2017/0242136 A1 | 8/2017 | O'Neill et al. | |
| 2018/0164414 A1* | 6/2018 | Gnecchi | G01S 7/4863 |
| 2018/0175230 A1 | 6/2018 | Droz et al. | |

(Continued)

OTHER PUBLICATIONS

González et al., "Position sensitive photosensors based on SiPM arrays," Sensors, IEEE, 2014, pp. 4.

(Continued)

*Primary Examiner* — David P Porta
*Assistant Examiner* — Mamadou Faye
(74) *Attorney, Agent, or Firm* — McDonnell Boehnen Hulbert & Berghoff LLP

(57) ABSTRACT

The present disclosure relates to devices, systems, and methods relating to configurable silicon photomultiplier (SiPM) devices. An example device includes a substrate and a plurality of single photon avalanche diodes (SPADs) coupled to the substrate. The device also includes a plurality of outputs coupled to the substrate and a plurality of electrical components coupled to the substrate. The plurality of electrical components are configured to selectively connect the plurality of SPADs to the plurality of outputs by selecting which output of the plurality of outputs is connected to each SPAD of the plurality of SPADs and to thereby define a plurality of SiPMs in the device such that each SiPM of the plurality of SiPMs comprises a respective set of one or more SPADs connected to a respective output of the plurality of outputs.

20 Claims, 7 Drawing Sheets

(56) References Cited

U.S. PATENT DOCUMENTS

| | | |
|---|---|---|
| 2019/0072649 A1 | 3/2019 | Droz et al. |
| 2019/0146071 A1 | 5/2019 | Donovan |
| 2019/0170866 A1* | 6/2019 | Iguchi .................... G01S 7/499 |
| 2020/0370955 A1* | 11/2020 | Hennecke ................ G01J 1/46 |

OTHER PUBLICATIONS

González et al., "Performance Study of a Wide-Area SiPM Array, ASICs Controlled," IEEE Transactions on Nuclear Science, Feb. 2015, pp. 19-26, vol. 62, No. 1.
International Search Report and Written Opinion, dated Jan. 4, 2021, in International Application No. PCT/US2020/051714.

* cited by examiner

500 

502 — Receiving, at a device, light via each of a plurality of apertures, wherein the device comprises (i) a plurality of single photon avalanche diodes (SPADs); (ii) a plurality of outputs; and (iii) a plurality of electrical components that are selectable to connect the plurality of SPADs to the plurality of outputs by selecting which output of the plurality of outputs is connected to each SPAD of the plurality of SPADs to define one or more silicon photomultipliers (SiPMs) in the device, wherein the SPADs, the plurality of outputs, and the plurality of electrical components are coupled to a substrate 504 — For each aperture, identifying which SPADs detect light received via the respective aperture and selecting one or more electrical components of the plurality of electrical components to electrically connect or disconnect

Figure 5

PROGRAMMABLE SIPM ARRAYS

BACKGROUND

A silicon photomultiplier (SiPM) may consist of an array of single photon avalanche diodes (SPADs) that are electrically connected in parallel.

Conventional SPAD arrays may incorporate individual time-digital converters (TDCs) for each SPAD pixel. Such SPAD arrays can be implemented in a fully "digital" manner at the array element, offering flexibility in a SiPM configuration. However, such designs require large amounts off-chip I/O bandwidth and dissipate a great deal of power.

Other conventional devices include SiPM having SPADs are wired in parallel. Such SiPM devices are fully "analog" at the subarrays level, but suffer from inflexible wiring arrangements. For example, if different resolution elements at the subarray level are desired or different positioning of those subarrays on the focal plane are needed, conventional SiPM devices are not able to adapt to such needs.

Accordingly, a reconfigurable SPAD array is desired with reduced power dissipation and I/O bandwidth compared to digital SPAD arrays.

SUMMARY

Example embodiments relate to methods, devices, and systems that relate to the detection of light. For example, some embodiments may relate to a receiver subsystem of a LIDAR system.

In a first aspect, a device is provided. The device includes a substrate and a plurality of single photon avalanche diodes (SPADs) coupled to the substrate. The device also includes a plurality of outputs coupled to the substrate and a plurality of electrical components coupled to the substrate. The plurality of electrical components are configured to selectively connect the plurality of SPADs to the plurality of outputs by selecting which output of the plurality of outputs is connected to each SPAD of the plurality of SPADs and to thereby define a plurality of silicon photomultipliers (SiPMs) in the device such that each SiPM of the plurality of SiPMs includes a respective set of one or more SPADs connected to a respective output of the plurality of outputs.

In a second aspect, a light detection and ranging (LIDAR) system is provided. The LIDAR system includes at least one light-emitter device and a receiver subsystem. The receiver subsystem includes a substrate and a plurality of single photon avalanche diodes (SPADs) coupled to the substrate. The receiver subsystem also includes a plurality of outputs coupled to the substrate and a plurality of electrical components coupled to the substrate. The plurality of electrical components are selectable to control which output of the plurality of outputs is connected to each SPAD of the plurality of SPADs and to thereby define a plurality of silicon photomultipliers (SiPMs) in the receiver subsystem. The receiver subsystem also includes an aperture array that includes a plurality of apertures. The SiPMs and the aperture array are aligned so as to define a plurality of receiver channels. Each receiver channel includes a respective SiPM optically coupled to a respective aperture of the plurality of apertures.

In a third aspect, a method is provided. The method includes receiving, at a device, light via each of a plurality of apertures. The device includes: (i) a plurality of single photon avalanche diodes (SPADs); (ii) a plurality of outputs; and (iii) a plurality of electrical components that are selectable to connect the plurality of SPADs to the plurality of outputs by selecting which output of the plurality of outputs is connected to each SPAD of the plurality of SPADs to define one or more silicon photomultipliers (SiPMs) in the device. The SPADs, the plurality of outputs, and the plurality of electrical components are coupled to a substrate. The method includes, for each aperture, identifying which SPADs detect light received via the respective aperture and selecting one or more electrical components of the plurality of electrical components to electrically connect or disconnect.

Other aspects, embodiments, and implementations will become apparent to those of ordinary skill in the art by reading the following detailed description, with reference where appropriate to the accompanying drawings.

BRIEF DESCRIPTION OF THE FIGURES

FIG. 5 illustrates a method, according to an example embodiment.

DETAILED DESCRIPTION

Figure 1:
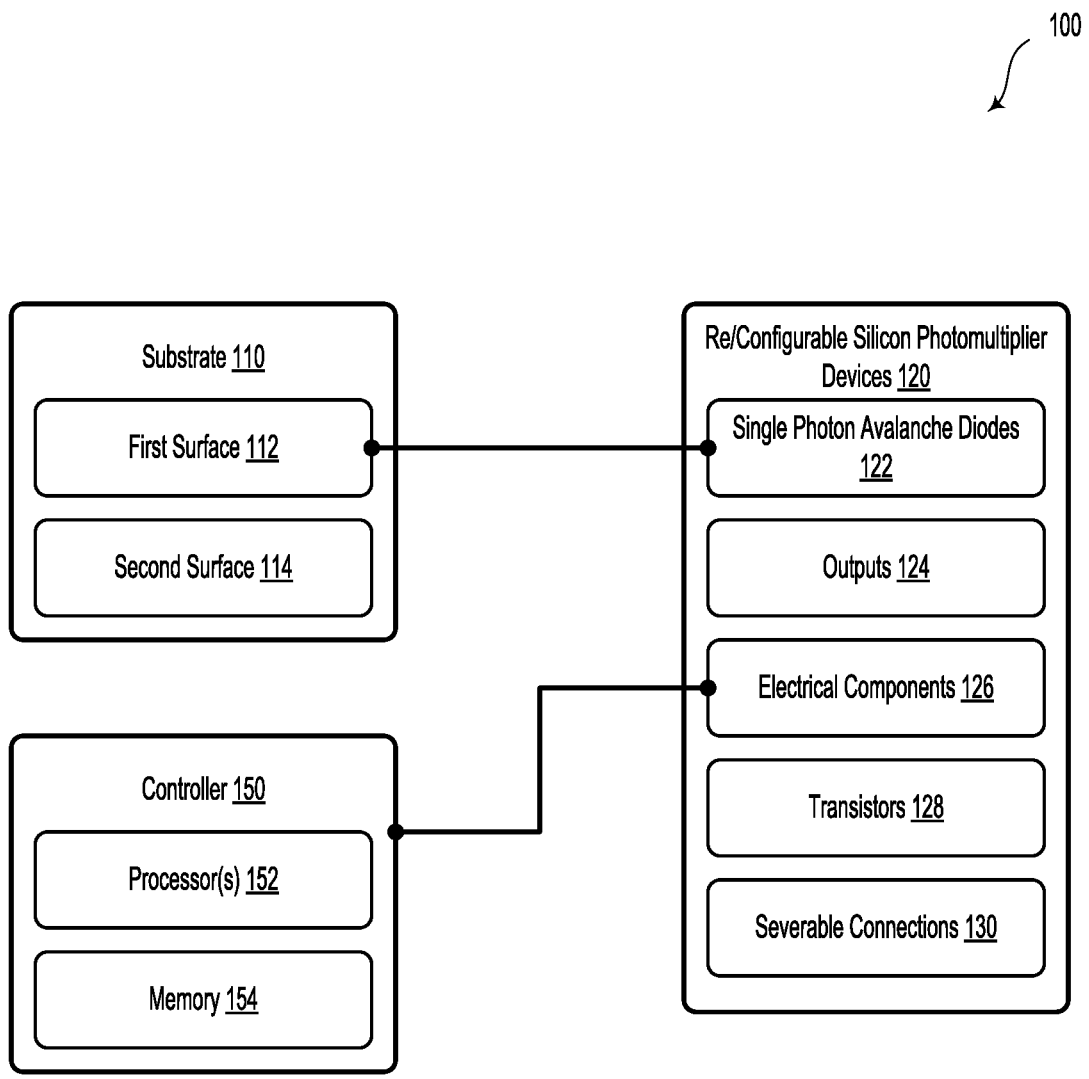
FIG. 1 illustrates a device, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

A SiPM includes an array of single photon avalanche diodes (SPADs) that are electrically connected in parallel. A SPAD is a single-photon sensitive device that is designed to operate in Geiger mode. A monolithic device may include a plurality of SPADs along with electrical components (e.g., transistors, fuses, switches, etc.) that can control how the SPADs are connected together (e.g., to control which SPADs are connected in parallel to define one or more SiPMs). In this way, the SPADs can be controllably connected together to define multiple SiPMs in the monolithic device.

In some implementations, the SiPM-defining connections of the SPADs may be selectable only a single time (e.g., a desired arrangement and/or desired number of utilized SiPMs may be "burned" into the device). In other implementations, the connections between the SPADs could be dynamically selectable, so that the arrangement of SiPMs in the monolithic device could be configured and then reconfigured. Either way, the ability to select where SiPMs are located in the monolithic device can be beneficial.

In example embodiments, it may be desirable to align the SiPMs with an array of apertures (e.g., a pinhole array to reduce detection of ambient light). To achieve this alignment, the individual SPADs may be used to detect where the light from each pinhole is incident on the monolithic device. For each given pinhole, the SPADs that detect light from that pinhole (as well as nearby SPADs) may be connected together to define a SiPM for that pinhole. For implementations in which the SiPMs can be reconfigured, it is possible to provide a dynamically controllable array of apertures instead of pinholes (e.g., using DLP or other micromirror devices) and to dynamically configure the SiPMs to match the array of apertures.

II. Example Devices

FIG. 1 illustrates a device 100, according to an example embodiment. The device 100 includes a substrate 110. In some embodiments, the substrate 110 could include a semiconductor substrate material such as a silicon substrate (e.g., a silicon wafer), a gallium arsenide substrate (e.g., a GaAs wafer), or the like. In some embodiments, the substrate 110 could include a silicon-on-insulator (SOI) material or printed circuit board (PCB). Alternatively, the substrate 110 could be formed from a variety of other solid and/or flexible materials, each of which is contemplated in the present disclosure.

In some embodiments, the substrate 110 could be approximately 200 microns thick. For instance, the substrate 110 could have a thickness of between 100 to 500 microns. However, other thicknesses are possible and contemplated.

The device 100 includes a plurality of single photon avalanche diodes (SPADs) 122 coupled to the substrate 110.

The device 100 also includes a plurality of outputs 124 coupled to the substrate 110.

The device 100 also includes a plurality of electrical components 126 coupled to the substrate 110. In such scenarios, the plurality of electrical components 126 are configured to selectively connect the plurality of SPADs 122 to the plurality of outputs 124 by selecting which output of the plurality of outputs is connected to each SPAD of the plurality of SPADs 122 and to thereby define a plurality of silicon photomultipliers (SiPMs) 120 in the device 100 such that each SiPM of the plurality of SiPMs 120 includes a respective set of one or more SPADs connected to a respective output of the plurality of outputs 124.

It will be understood that while the present disclosure describes the use of SPADs 122 and SiPMs 120, other types of photodetectors are possible and contemplated. For example, other photodetectors designed to operate in Geiger mode are possible and contemplated. Furthermore, while SiPM 120 as described herein may relate to silicon-based devices, it will be understood that photodetectors utilizing other materials are possible and contemplated. For example, the various light-detecting elements described herein could be formed using other semiconductor materials such as germanium or compound semiconductor materials such as GaAs/AlGaAs, InGaAs/InP, or InGaAsP/InP. Other photodetector materials are contemplated.

In some embodiments, the SPADs 122 could include semiconductor devices that include a p-n junction that is designed to operate when reverse-biased at a voltage $V_a$ greater than a breakdown voltage Vs of the junction. For example, $V_a$ could be applied across the p-n junction, which could be approximately 1-5 microns thick, so as to provide an electric field greater than $3 \times 10^5$ V/cm. Other electric fields are possible and contemplated.

In some embodiments, the SPADs 122 could be configured to detect infrared light (e.g., 905 nm or 1550 nm). However, other wavelengths of light could be detected as well. The SPADs 122 could be configured and/or biased so as to provide a milliampere or more of photocurrent in response to absorbing a single photon. Other configurations and/or photocurrents are possible and contemplated.

In some embodiments, the SPADs 122 could include a passive or active quenching circuit. For example, the passive quenching circuit could include a resistor coupled in series with the SPAD. Additionally or alternatively, the active quenching circuit could include a fast discriminator circuit or a synchronous bias voltage reduction circuit.

For example, each SiPM of the plurality of SiPMs 120 could include at least 1000 SPADs 122. It will be understood that more or less SPADs 122 could be associated with each SiPM of the plurality of SiPMs 120. In some embodiments, the SiPMs of the plurality of SiPMs 120 are arranged along the substrate 110 with a density of about 0.4 SiPMs per $mm^2$.

In some embodiments, the electrical components 126 could be configured to selectively connect the plurality of SPADs 122 to the plurality of outputs only a single time.

Alternatively, the electrical components 126 could be configured to selectively connect the plurality of SPADs 122 to the plurality of outlets in a dynamic fashion.

In example embodiments, the electrical components 126 could include one or more transistors 128. Additionally or alternatively, the electrical components 126 could include severable connections 130. In such scenarios, the severable connections 130 could include at least one of: a switch, a fuse, or a laser-trimmable trace. For example, the plurality of electrical components may be coupled to the plurality of SPADs 122 via at least one of: a through substrate via (TSV) or a side routing arrangement. In some embodiments, the severable connections 130 could be utilized to eliminate or disconnect any "noisy" or malfunctioning SPADs 122 that may be identified in post-production and/or calibration of the detector array.

In some embodiments, each SPAD of the plurality of SPADs 122 could include a respective quenching circuit. In such scenarios, the respective quenching circuit could include a quenching resistor. Other types of quenching circuits are possible and contemplated.

The device 100 additionally includes a controller 150. In some embodiments, the controller 150 could be a read-out integrated circuit (ROIC). Additionally or alternatively, the controller 150 may include at least one of a field-programmable gate array (FPGA) or an application-specific integrated circuit (ASIC). Additionally or alternatively, the controller 150 may include one or more processors 152 and a memory 154. The one or more processors 152 may include a general-purpose processor or a special-purpose processor (e.g., digital signal processors, etc.). The one or more processors 152 may be configured to execute computer-readable program instructions that are stored in the memory 154. In some embodiments, the one or more processors 152 may execute the program instructions to provide at least some of the functionality and operations described herein.

The memory 154 may include or take the form of one or more computer-readable storage media that may be read or accessed by the one or more processors 152. The one or more computer-readable storage media can include volatile and/or non-volatile storage components, such as optical, magnetic, organic or other memory or disc storage, which may be integrated in whole or in part with at least one of the one or more processors 152. In some embodiments, the memory 154 may be implemented using a single physical device (e.g., one optical, magnetic, organic or other memory or disc storage unit), while in other embodiments, the memory 154 can be implemented using two or more physical devices.

As noted, the memory 154 may include computer-readable program instructions that relate to operations of device 100. The at least one processor 152 executes instructions stored in the at least one memory 154 so as to carry out operations.

Figure 2A:
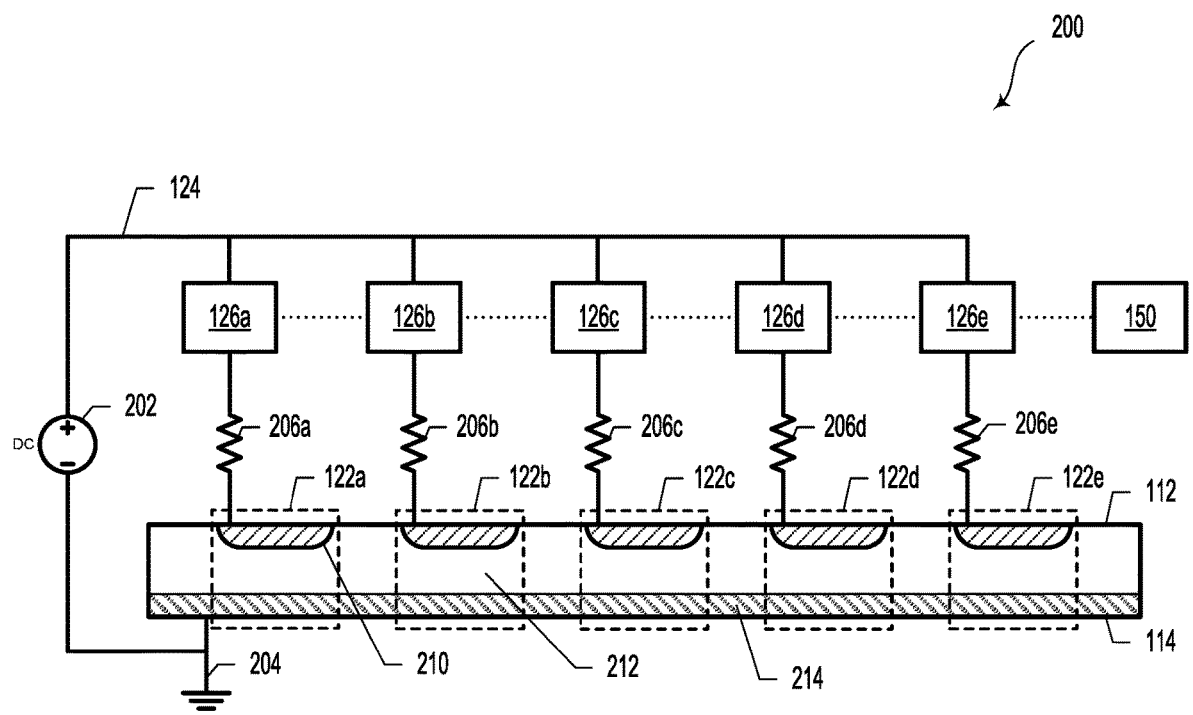
FIG. 2A illustrates a device, according to an example embodiment.
Figure 2A:
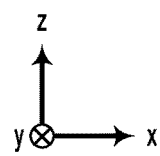

FIG. 2A illustrates a device 200, according to an example embodiment. In some embodiments, device 200 could be similar or identical to device 100, as illustrated and described in references in FIG. 1. Device 200 could include a plurality of SPADs 122a, 122b, 122c, 122d, and 122e. Each of the plurality of SPADs 122a, 122b, 122c, 122d, and 122e could include a p-doped region 210, an avalanche region 212, and an n-doped body region 214.

Device 200 includes a voltage bias source 202, which could include a constant voltage and/or constant current bias circuit (e.g., voltage/current divider or equivalent). In some embodiments, each of the SPADs 122a, 122b, 122c, 122d, and 122e could be electrically coupled to a quenching circuit 206a, 206b, 206c, 206d, and 206e. The respective quenching circuits 206a, 206b, 206c, 206d, and 206e could be electrically coupled to electrical components 126a, 126b, 126c, 126d, and 126e. Furthermore, in some embodiments, the electrical components 126a, 126b, 126c, 126d, and 126e could be electrically coupled to (e.g., controlled by) controller 150. In some embodiments, output 124 could include a node at which a SiPM output signal is obtained.

Figure 2B:
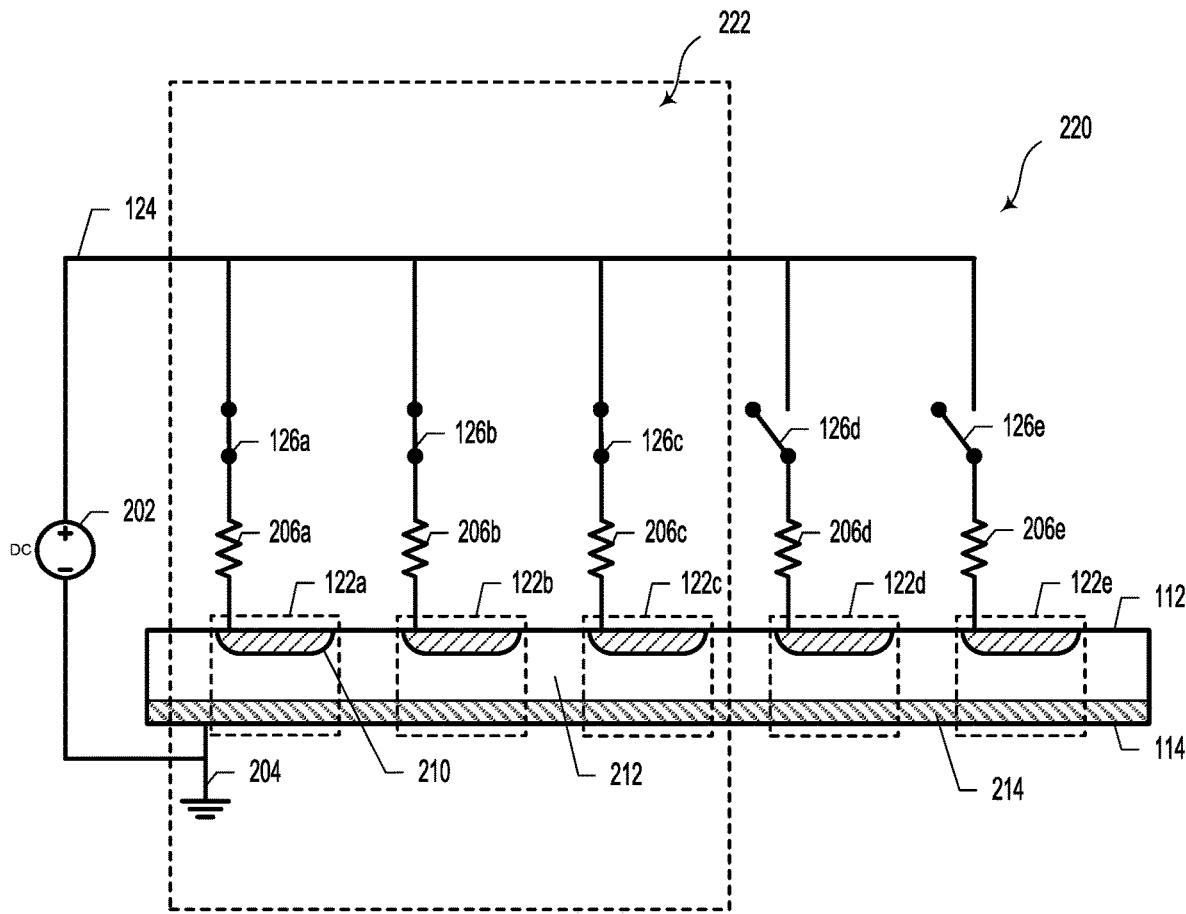
FIG. 2B illustrates a device, according to an example embodiment.

FIG. 2B illustrates a device 220, according to an example embodiment. As illustrated in FIG. 2B, some electrical components 126a, 126b, and 126c electrically couple the SPADs 122a, 122b, and 122c to the output 124 (via their respective quenching circuits 206a, 206b, and 206c). Furthermore, other electrical components 126d and 126e are electrically open, so that SPADs 122d and 122e are not electrically coupled to the output 124. In such a scenario, the SPADs 122a, 122b, and 122c may provide a respective SiPM 222 and may additionally provide a combined SiPM output signal at the output 124. While the electrical components 126a-126e are illustrated as electrical switches, it will be understood that electrical components 126a-126e could be adjusted only once, or multiple times. For example, the electrical components 126a-126e could include switchable MOSFETs or BJTs. Additionally or alternatively, the electrical components 126a-126e could include laser-trimmable traces or other types of electrical switches.

Figure 2C:
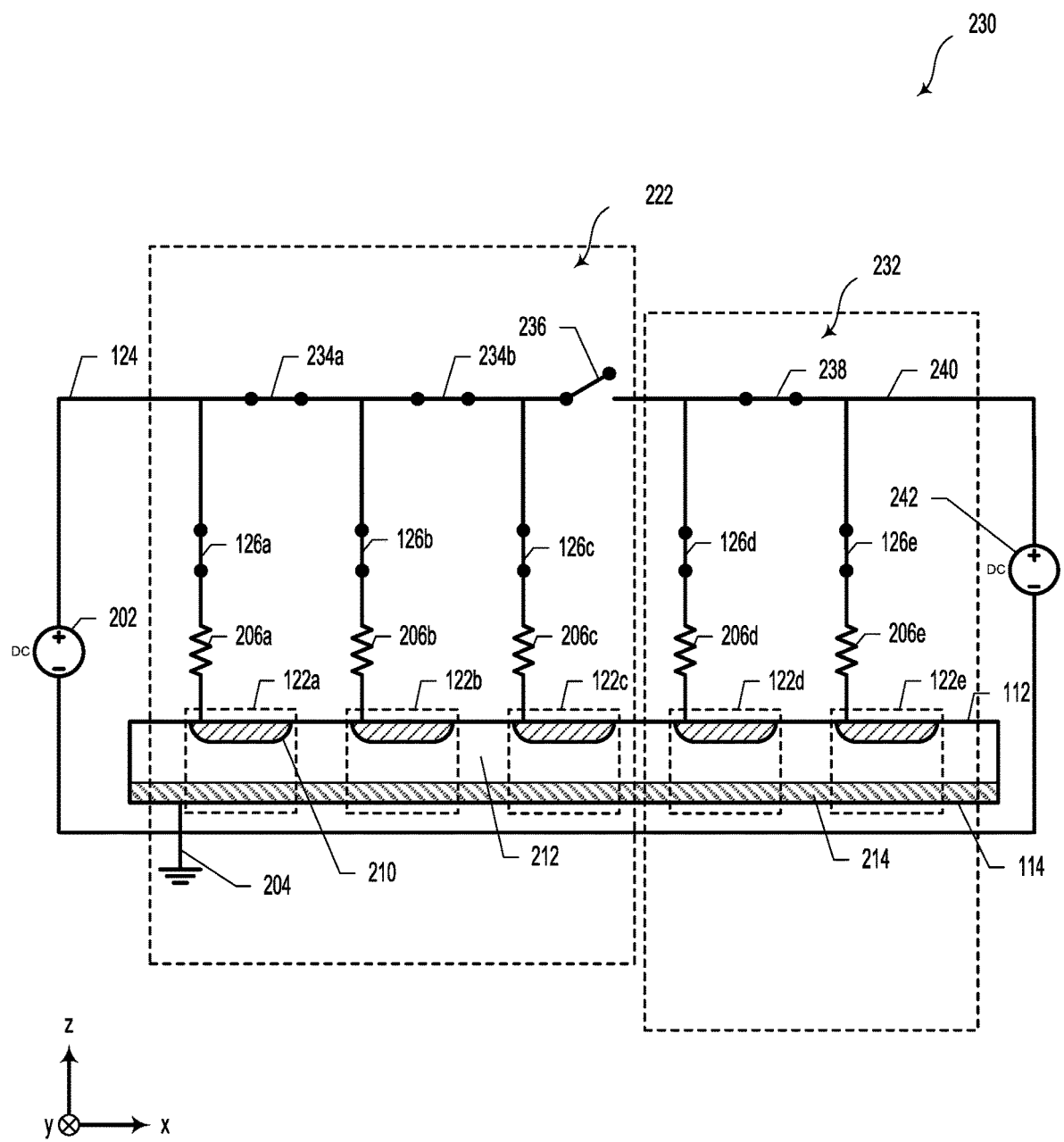
FIG. 2C illustrates a device, according to an example embodiment.

FIG. 2C illustrates a device 230, according to an example embodiment. As illustrated, the SPADs 122a, 122b, and 122c may provide a first SiPM 222 and a corresponding SiPM output signal at the output 124. As an example, switches 234a and 234b may close to connect SPADs 122a, 122b, and 122c in parallel and to provide the output 124. Furthermore, the SPADs 122d and 122e could be connected together to provide a second SiPM 232. In such a scenario, switch 238 may close to connect SPADs 122d and 122e and provide a second output 240. Yet further, switch 236 could open to isolate output 124 from output 240. In some embodiments, second SiPM 232 could provide a second voltage bias source 242. In other words, device 230 could provide an adjustable circuit arrangement of SPADs so as to provide a once-configurable or re-configurable plurality of SiPM devices.

It will be understood that switches 126a, 126b, 126c, 126d, 126e, 234a, 234b, 236, and 238 could be part of a switching network, which could include, for example, a multiplexer, a demultiplexer, one or more crossbar switches, or other types of switching components. Furthermore, while FIGS. 2A, 2B, and 2C various electrical circuits and component arrangements, it will be understood that a variety of different electrical configurations and arrangements are possible and contemplated.

III. Example LIDAR Systems

Figure 3:
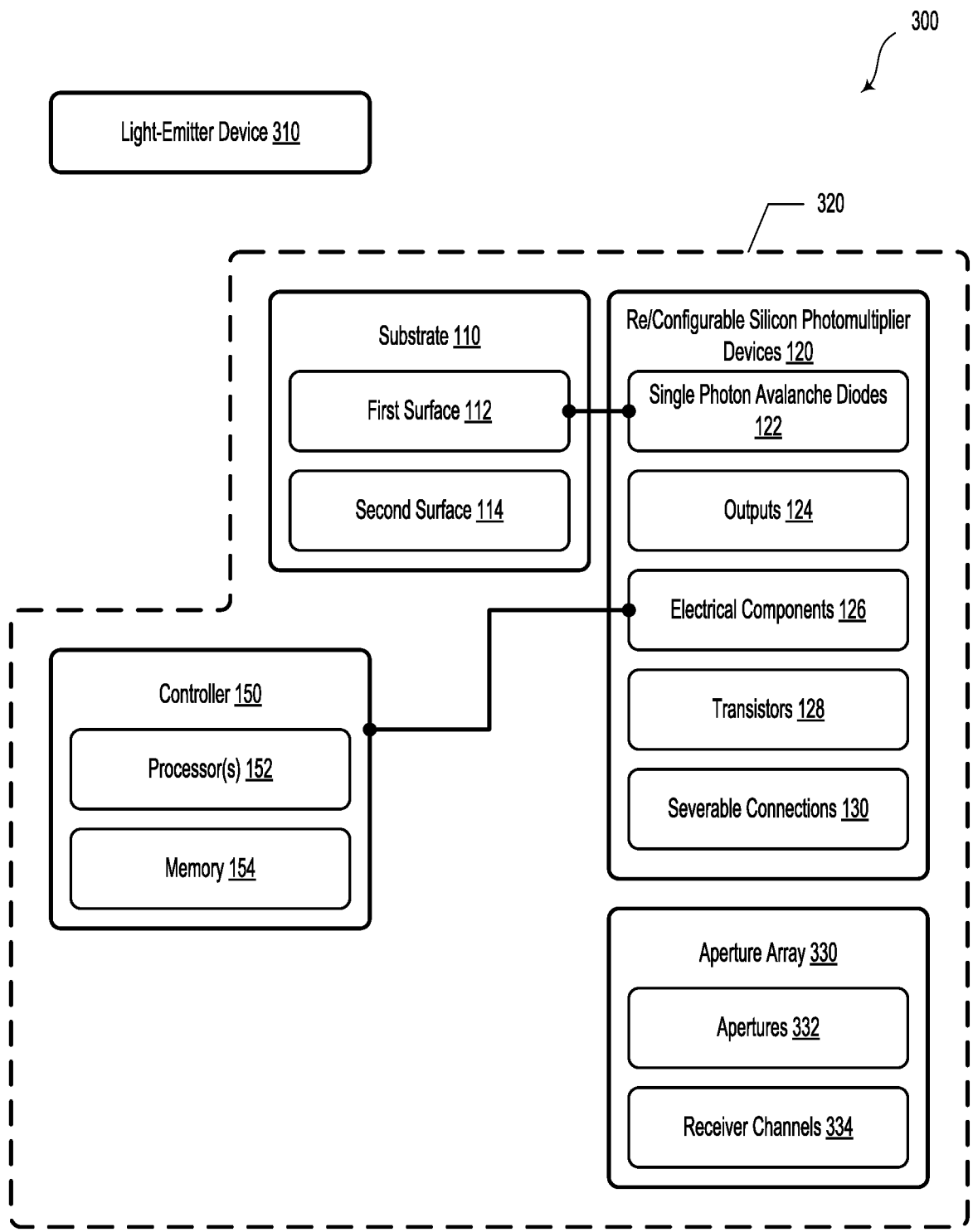
FIG. 3 illustrates a light detection and ranging system, according to an example embodiment.

FIG. 3 illustrates a light detection and ranging (LIDAR) system 300, according to an example embodiment. The LIDAR system may be coupled to a vehicle and used in the operation of the vehicle, such as when the vehicle is in an autonomous or semi-autonomous mode or when the vehicle is a fully autonomous vehicle. A vehicle may be, for example, a car, truck, tractor-trailer, construction equipment such as bulldozers, or sidewalk delivery robot. The LIDAR system 300 includes at least one light-emitter device 310 and a receiver subsystem 320. The receiver subsystem 320 includes a substrate 110 and a plurality of single photon avalanche diodes (SPADs) 122 coupled to the substrate 110.

The receiver subsystem 320 includes a plurality of outputs 124 coupled to the substrate 110.

The receiver subsystem 320 also includes a plurality of electrical components 126 coupled to the substrate 110. In such scenarios, the plurality of electrical components 126 are selectable to control which output of the plurality of outputs 124 is connected to each SPAD of the plurality of SPADs 122 and to thereby define a plurality of silicon photomultipliers (SiPMs) 120 in the receiver subsystem 320.

The receiver subsystem 320 also includes an aperture array 330. The aperture array 330 includes a plurality of apertures 332. The SiPMs 120 and the aperture array 330 are aligned so as to define a plurality of receiver channels 334. In such scenarios, each receiver channel 334 includes a respective SiPM optically coupled to a respective aperture of the plurality of apertures 332.

In some embodiments, each SiPM includes a respective contiguous region of the plurality of SPADs 122.

In some embodiments, the electrical components 126 are selectable only a single time. Additionally or alternatively, the electrical components 126 could be dynamically selectable. As an example, the electrical components 126 could include transistors 128. In some other embodiments, the electrical components 126 could include severable connections 130. As an example, the severable connections 130 could include at least one of: a switch, a fuse, or a laser-trimmable trace.

Figure 4:
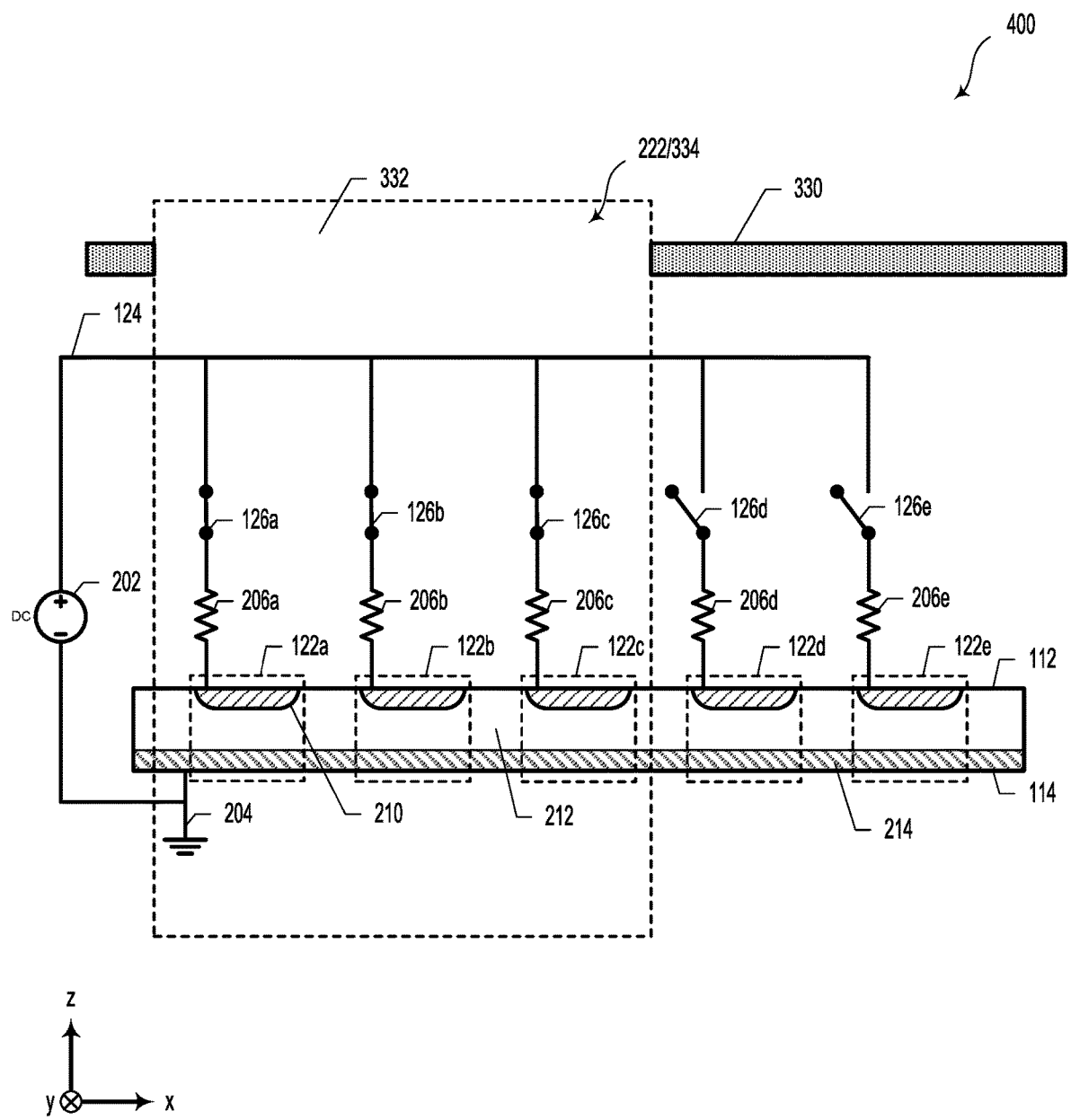
FIG. 4 illustrates a light detection and ranging system, according to example embodiments.

FIG. 4 illustrates a LIDAR system 400, according to example embodiments. LIDAR system 400 could include elements that are similar or identical to device 200, as illustrated and described in reference to FIG. 2. As illustrated in FIG. 4, LIDAR system 400 may include an aperture array 330 and aperture 332. For example, the SPADs 122a, 122b, and 122c could be arranged with respect to the aperture 332.

Furthermore, electrical components 126a, 126b, and 126c could electrically connect the SPADs 122a, 122b, and 122c to output 124 so as to form SiPM 222. In such a manner, the aperture 332 and SPADs 122a, 122b, and 122c could form a receiver channel of the plurality of receiver channels 334.

In some embodiments, LIDAR system 400 could be assembled using an "alignment-free" assembly process. For example, in such scenarios, LIDAR system 400 could be pre-assembled prior to mating with the SPADs 122. Upon un-aligned mating between the SPADs 122 and the rest of the LIDAR, a reference detector at the focal plane could be utilized to characterize the light intensity per unit area and as a result, get a desired mapping of respective SPADs 122 to optical channels the given detector array. Based on the characterization, the severable connections 130 could be severed and/or otherwise adjusted accordingly.

In such a scenario, such a LIDAR system 400 may offer greater flexibility, improved modularity, and improved alignment tolerance. For example, a single type of SPAD detector array could be utilized with a variety of other LIDAR elements. In such a fashion, the various elements of LIDAR system 400 could "mixed and matched" with a universal SPAD detector array. Accordingly, such a SPAD detector array could be flexibly reconfigured for the needs of various types of LIDAR systems (e.g., for low/high spatial resolution, for better/worse low-light capability, etc.). Such a design may reduce cost and complexity while improving serviceability and product life.

IV. Example Methods

FIG. 5 illustrates a method 500, according to an example embodiment. It will be understood that the method 500 may include fewer or more steps or blocks than those expressly illustrated or otherwise disclosed herein. Furthermore, respective steps or blocks of method 500 may be performed in any order and each step or block may be performed one or more times. In some embodiments, some or all of the blocks or steps of method 500 may relate to elements of devices 100 and 200 as illustrated and described in relation to FIGS. 1, 2A, and 2B. Additionally or alternatively, some or all of the blocks or steps of method 500 may relate to elements of the LIDAR systems 300 or 400 as illustrated and described in relation to FIGS. 3 and 4.

Block 502 includes receiving, at a device (e.g., device 100), light via each of a plurality of apertures (e.g., apertures 332). The device includes a plurality of single photon avalanche diodes (SPADs) (e.g., SPADs 122). The device additionally includes a plurality of outputs (e.g., outputs 124) and a plurality of electrical components (e.g., electrical components 126) that are selectable to connect the plurality of SPADs to the plurality of outputs by selecting which output of the plurality of outputs is connected to each SPAD of the plurality of SPADs to define one or more silicon photomultipliers (SiPMs) (e.g., SiPMs 120) in the device. The SPADs, the plurality of outputs, and the plurality of electrical components are coupled to a substrate (e.g., substrate 110).

In some embodiments, the one or more electrical components could include at least one of: a transistor or a severable connection. As an example, the severable connection could include at least one of: a switch, a fuse, or a laser-trimmable trace.

In some examples, selecting the one or more electrical components is performed a single time. Alternatively, selecting the one or more electrical components could be performed dynamically and/or at multiple times.

In some embodiments, the plurality of apertures could include an array of pinholes that are optically coupled to the device.

The method 500 may include optically coupling the plurality of apertures to the device. In some embodiments, optically coupling the plurality of apertures to the device could include arranging an aperture array (e.g., aperture array 330) and respective apertures 332 with respect to the SPADs 122.

Block 504 includes, for each aperture, identifying which SPADs detect light received via the respective aperture and selecting one or more electrical components of the plurality of electrical components to electrically connect or disconnect.

As an example, the method 500 could include causing one or more light sources (e.g., light-emitter device 310) to emit a light signal. Causing the light source to emit the light signal could include causing a pulser circuit to transmit a current or voltage pulse to the light source so as to generate one or more light pulses. In some embodiments, the light pulses could interact with an environment of the system so as to provide an interaction light signal. The interaction light signal could include, for example, a reflected light signal that may interact with (e.g., impinge on) the respective apertures.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A device comprising:
a substrate;
a plurality of single photon avalanche diodes (SPADs) coupled to the substrate;
a plurality of outputs coupled to the substrate; and
a plurality of electrical components coupled to the substrate, wherein the plurality of electrical components are configured to selectively connect the plurality of SPADs to the plurality of outputs by selecting which output of the plurality of outputs is connected to each SPAD of the plurality of SPADs and to thereby define a plurality of silicon photomultipliers (SiPMs) in the device such that each SiPM of the plurality of SiPMs comprises a respective set of one or more SPADs connected to a respective output of the plurality of outputs.

2. The device of claim 1, wherein the electrical components are configured to selectively connect the plurality of SPADs to the plurality of outputs only a single time.

3. The device of claim 1, wherein the electrical components are configured to selectively connect the plurality of SPADs to the plurality of outlets in a dynamic fashion.

4. The device of claim 1, wherein the electrical components comprise transistors.

5. The device of claim 1, wherein the electrical components comprise severable connections.

6. The device of claim 5, wherein the severable connections comprise at least one of: a switch, a fuse, or a laser-trimmable trace.

7. The device of claim 1, wherein each SPAD of the plurality of SPADs comprises a respective quenching circuit, wherein the respective quenching circuit comprises a quenching resistor.

8. A light detection and ranging (LIDAR) system comprising:
at least one light-emitter device; and
a receiver subsystem, wherein the receiver subsystem comprises: a substrate;
a plurality of single photon avalanche diodes (SPADs) coupled to the substrate;
a plurality of outputs coupled to the substrate;
a plurality of electrical components coupled to the substrate, wherein the plurality of electrical components are selectable to control which output of the plurality of outputs is connected to each SPAD of the plurality of SPADs and to thereby define a plurality of silicon photomultipliers (SiPMs) in the receiver subsystem; and
an aperture array comprising a plurality of apertures, wherein the SiPMs and the aperture array are aligned so as to define a plurality of receiver channels, wherein each receiver channel comprises a respective SiPM optically coupled to a respective aperture of the plurality of apertures.

9. The LIDAR system of claim 8, wherein each SiPM comprises a respective contiguous region of the plurality of SPADs.

10. The LIDAR system of claim 8, wherein the electrical components are selectable only a single time.

11. The LIDAR system of claim 8, wherein the electrical components are dynamically selectable.

12. The LIDAR system of claim 8, wherein the electrical components comprise transistors.

13. The LIDAR system of claim 8, wherein the electrical components comprise severable connections.

14. The LIDAR system of claim 13, wherein the severable connections comprise at least one of: a switch, a fuse, or a laser-trimmable trace.

15. A method comprising:
receiving, at a device, light via each of a plurality of apertures, wherein the device comprises (i) a plurality of single photon avalanche diodes (SPADs); (ii) a plurality of outputs; and (iii) a plurality of electrical components that are selectable to connect the plurality of SPADs to the plurality of outputs by selecting which output of the plurality of outputs is connected to each SPAD of the plurality of SPADs to define one or more silicon photomultipliers (SiPMs) in the device, wherein the SPADs, the plurality of outputs, and the plurality of electrical components are coupled to a substrate; and
for each aperture, identifying which SPADs detect light received via the respective aperture and selecting one or more electrical components of the plurality of electrical components to electrically connect or disconnect.

16. The method of claim 15, wherein the plurality of apertures comprises an array of pinholes optically coupled to the device.

17. The method of claim 15, further comprising:
optically coupling the plurality of apertures to the device.

18. The method of claim 15, wherein the one or more electrical components comprise at least one of: a transistor or a severable connection, wherein the severable connection comprises at least one of: a switch, a fuse, or a laser-trimmable trace.

19. The method of claim 15, wherein selecting the one or more electrical components is performed a single time.

20. The method of claim 15, wherein selecting the one or more electrical components is performed dynamically.

* * * * *